United States Patent
Shim et al.

(10) Patent No.: US 6,977,970 B2
(45) Date of Patent: Dec. 20, 2005

(54) DATA REPRODUCING APPARATUS AND METHOD FOR IMPROVING DETECTION PERFORMANCE BY ADJUSTING DECISION LEVELS USED IN DATA DETECTOR

(75) Inventors: Jae-seong Shim, Seoul (KR); Hyun-soo Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 843 days.

(21) Appl. No.: 09/756,694

(22) Filed: Jan. 10, 2001

(65) Prior Publication Data

US 2001/0016002 A1 Aug. 23, 2001

(30) Foreign Application Priority Data

Jan. 10, 2000 (KR) ............................................. 2000 965

(51) Int. Cl.[7] .............................................. H04L 25/06
(52) U.S. Cl. ...................... 375/317; 375/229; 375/233; 369/59.21; 369/59.22; 360/65; 714/809; 370/523
(58) Field of Search ................................ 375/229, 233, 375/317; 369/59.21, 59.22; 360/65; 714/809; 370/523

(56) References Cited

U.S. PATENT DOCUMENTS

| | | | | | |
|---|---|---|---|---|---|
| 5,455,813 | A | * | 10/1995 | Hayashi | 369/59.21 |
| 5,508,993 | A | * | 4/1996 | Hayashi et al. | 369/59.22 |
| 5,917,855 | A | * | 6/1999 | Kim | 375/229 |
| 6,108,354 | A | * | 8/2000 | Scull et al. | 370/523 |
| 6,198,587 | B1 | * | 3/2001 | Hayashi | 360/65 |
| 6,275,967 | B1 | * | 8/2001 | Kuki | 714/809 |
| 6,552,988 | B1 | * | 4/2003 | Nishiwaki et al. | 369/59.22 |
| 6,600,779 | B1 | * | 7/2003 | Sawada et al. | 375/233 |

FOREIGN PATENT DOCUMENTS

| | | |
|---|---|---|
| JP | 4-268255 | 9/1992 |
| JP | 5-26909 | 2/1993 |
| JP | 5-314653 | 11/1993 |
| JP | 5-314654 | 11/1993 |
| JP | 5-325413 | 12/1993 |
| JP | 6-124542 | 5/1994 |
| JP | 7-262694 | 10/1994 |
| JP | 8-249829 | 9/1996 |
| JP | 9-320206 | 12/1997 |
| JP | 10-64192 | 3/1998 |
| JP | 10-106162 | 4/1998 |
| JP | 10-326457 | 12/1998 |
| JP | 11-203795 | 7/1999 |

OTHER PUBLICATIONS

JP–8249829; Uchida Narichika; English Machine Translation.*

Tory Catpus, "PRML Signal Processing Technology," Sep. 2, 1996.

* cited by examiner

Primary Examiner—Stephen Chin
Assistant Examiner—Sudhanshu C. Pathak
(74) Attorney, Agent, or Firm—Stein, McEwen & Bui, LLP (57) ABSTRACT

A data reproducing apparatus and method for improving data detection performance by adjusting decision levels used in a data detector. The data reproducing apparatus includes an equalizer which equalizes an input digital signal, a data detector which detects data from the output of the equalizer based on decision levels, and a level decision unit which detects levels corresponding to the decision levels used in the data detector from the output of the equalizer and feeds back corrected decision levels, which adaptively vary with the output level of the equalizer, to the data detector. Accordingly, the detection performance of the data detector is improved.

23 Claims, 11 Drawing Sheets

| CONDITIONS | +MID LEVEL ENABLE | -MID LEVEL ENABLE | +MAX LEVEL ENABLE | -MAX LEVEL ENABLE | ZERO LEVEL ENABLE | SEL1 | SEL0 | OUTPUT OF MUX |
|---|---|---|---|---|---|---|---|---|
| $y_k[t+n-1] * y_k[t+n]<0$ AND $y_k[t+n-1]>0$ | ENABLE | DISABLE | DISABLE | DISABLE | DISABLE | 0 | 1 | $y_k[t+n-1]$ |
| | DISABLE | ENABLE | DISABLE | DISABLE | DISABLE | 0 | 0 | $y_k[t+n]$ |
| $y_k[t+n-1] * y_k[t+n]<0$ AND $y_k[t+n-1]\leq 0$ | ENABLE | DISABLE | DISABLE | DISABLE | DISABLE | 0 | 0 | $y_k[t+n]$ |
| | DISABLE | ENABLE | DISABLE | DISABLE | DISABLE | 0 | 1 | $y_k[t+n-1]$ |
| $y_k[t+n-2], y_k[t+n-1]$ AND $y_k[t+n]$ ARE LARGER THAN Th | DISABLE | DISABLE | ENABLE | DISABLE | DISABLE | 0 | 1 | $y_k[t+n-1]$ |
| $y_k[t+n-2], y_k[t+n-1]$ AND $y_k[t+n]$ ARE SMALLER THAN Th | DISABLE | DISABLE | DISABLE | ENABLE | DISABLE | 0 | 1 | $y_k[t+n-1]$ |

FIG. 5

| CONDITIONS | +MID LEVEL | -MID LEVEL | +MAX LEVEL | -MAX LEVEL | ZERO LEVEL | SEL1 | SEL0 | OUTPUT OF MUX |
|---|---|---|---|---|---|---|---|---|
| $y_k[t+n-2] * y_k[t+n-1] \leq 0$, $\|y_k[t+n-2]\| \leq \|y_k[t+n-1]\|$ AND $y_k[t+n-1] > 0$ | ENABLE | DISABLE | DISABLE | DISABLE | DISABLE | 0 | 1 | $y_k[t+n-1]$ |
| $y_k[t+n-2] * y_k[t+n-1] \leq 0$, $\|y_k[t+n-2]\| \leq \|y_k[t+n-1]\|$ AND $y_k[t+n-1] \leq 0$ | DISABLE | ENABLE | DISABLE | DISABLE | DISABLE | 1 | 1 | $y_k[t+n-3]$ |
| $y_k[t+n-2] * y_k[t+n-1] \leq 0$, $\|y_k[t+n-2]\| > \|y_k[t+n-1]\|$ AND $y_k[t+n-2] > 0$ | ENABLE | DISABLE | DISABLE | DISABLE | DISABLE | 0 | 1 | $y_k[t+n-3]$ |
| $y_k[t+n-2] * y_k[t+n-1] \leq 0$, $\|y_k[t+n-2]\| > \|y_k[t+n-1]\|$ AND $y_k[t+n-2] \leq 0$ | DISABLE | ENABLE | DISABLE | DISABLE | DISABLE | 1 | 1 | $y_k[t+n-1]$ |
| $y_k[t+n-2] * y_k[t+n-1] \leq 0$, $\|y_k[t+n-2]\| \leq \|y_k[t+n-1]\|$ AND $y_k[t+n-2] > 0$ | ENABLE | DISABLE | DISABLE | DISABLE | DISABLE | 1 | 0 | $y_k[t+n-2]$ |
| $y_k[t+n-2] * y_k[t+n-1] \leq 0$, $\|y_k[t+n-2]\| \leq \|y_k[t+n-1]\|$ AND $y_k[t+n-2] \leq 0$ | DISABLE | ENABLE | DISABLE | DISABLE | DISABLE | 0 | 0 | $y_k[t+n]$ |
| $y_k[t+n-2] * y_k[t+n-1] \leq 0$, $\|y_k[t+n-2]\| > \|y_k[t+n-1]\|$ AND $y_k[t+n-2] > 0$ | ENABLE | DISABLE | DISABLE | DISABLE | DISABLE | 0 | 0 | $y_k[t+n]$ |
| $y_k[t+n-2] * y_k[t+n-1] \leq 0$, $\|y_k[t+n-2]\| > \|y_k[t+n-1]\|$ AND $y_k[t+n-2] \leq 0$ | DISABLE | ENABLE | DISABLE | DISABLE | DISABLE | 1 | 0 | $y_k[t+n-2]$ |
| $y_k[t+n-2]$, $y_k[t+n]$ AND $y_k[t+n-1]$ ARE LARGER THAN Th | DISABLE | DISABLE | ENABLE | DISABLE | DISABLE | 0 | 1 | $y_k[t+n-1]$ |
| $y_k[t+n-2]$, $y_k[t+n]$ AND $y_k[t+n-1]$ ARE SMALLER THAN Th | DISABLE | DISABLE | DISABLE | ENABLE | DISABLE | 0 | 1 | $y_k[t+n-1]$ |
| $y_k[t+n-1] * y_k[t+n] \leq 0$ AND $\|y_k[t+n-1]\| \leq \|y_k[t+n]\|$ | DISABLE | DISABLE | DISABLE | DISABLE | ENABLE | 0 | 1 | $y_k[t+n-1]$ |
| $y_k[t+n-1] * y_k[t+n] \leq 0$ AND $\|y_k[t+n-1]\| > \|y_k[t+n]\|$ | DISABLE | DISABLE | DISABLE | DISABLE | ENABLE | 0 | 0 | $y_k[t+n]$ |

DATA REPRODUCING APPARATUS AND METHOD FOR IMPROVING DETECTION PERFORMANCE BY ADJUSTING DECISION LEVELS USED IN DATA DETECTOR

CROSS-REFERENCE TO RELATED APPLICATIONS

This application claims the benefit of Korean Application No. 00-965 filed Jan. 10, 2000, in the Korean Patent Office, the disclosure of which is incorporated herein by reference.

BACKGROUND OF THE INVENTION

1. Field of the Invention

The present invention relates to data reproduction, and more particularly, to a data reproducing apparatus for and method of improving data detection performance by adjusting decision levels used in a data detector and a method.

2. Description of the Related Art

Technology related to a partial response maximum likelihood (PRML) has been developed to increase a recording density through signal processing without sharply changing the characteristics of conventional recording/reproducing apparatuses, and many specific means based on this technology have been proposed.

Figure 1:
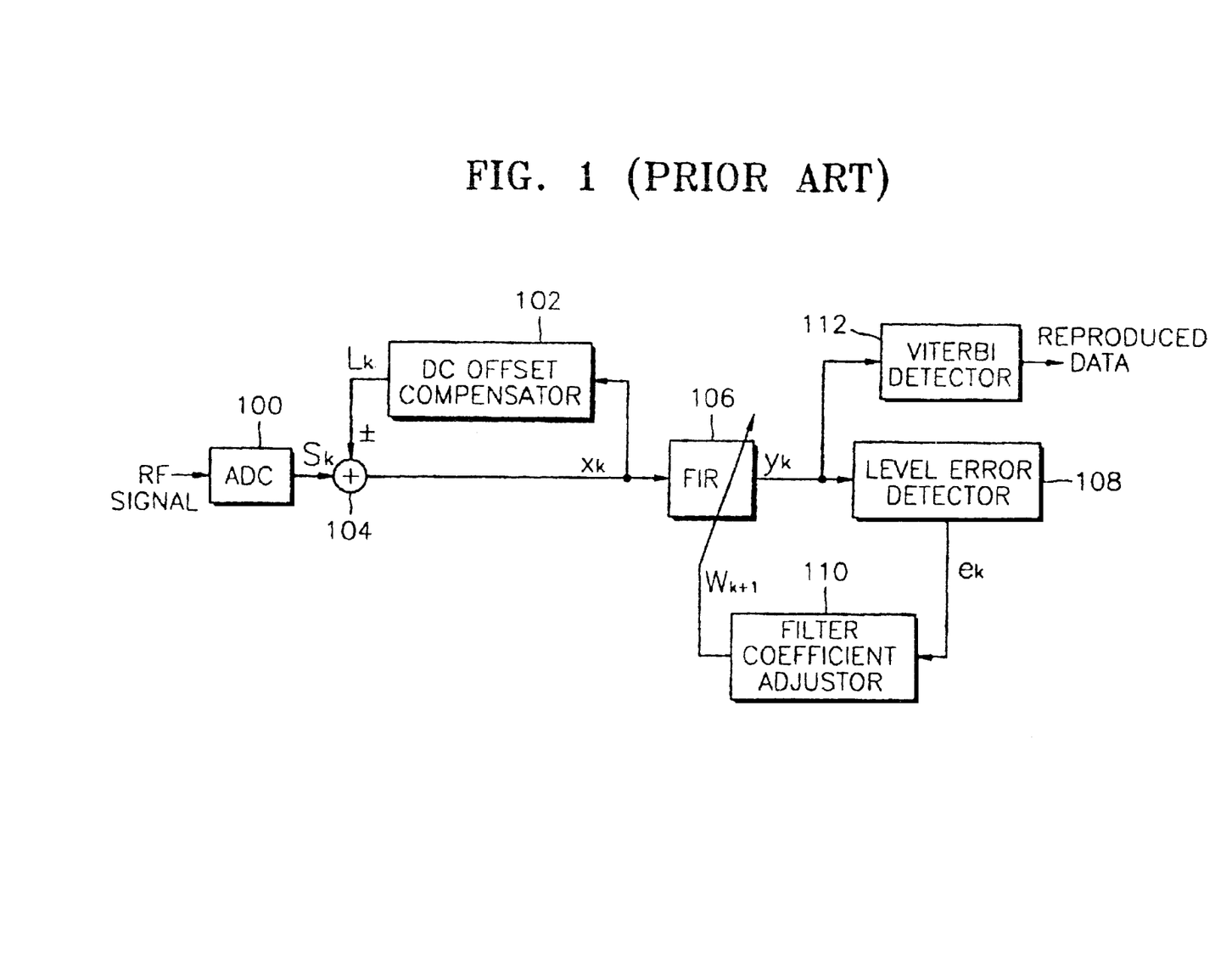
FIG. 1 is a block diagram illustrating a conventional data reproducing apparatus.

In FIG. 1, which is a block diagram illustrating a conventional data reproducing apparatus, an analog to digital converter (ADC) 100 samples an input radio frequency (RF) signal. A direct current (DC) offset compensator 102 and an adder 104 compensate for a DC offset component contained in the sampled RF data, and the compensated result is provided to an equalizer 106. A level error detector 108 detects an error $e_k$ between an target value and the output of the equalizer 106 composed of a finite impulse response (FIR) filter, based on the level of a minimum pit (or a mark)—3T (T: a bit space) in the case of a conventional digital versatile disc (DVD) or compact disc (CD).

Where an error value detected by the level error detector 108 is positive (+), a filter coefficient adjustor 110 determines that the level of the minimum pit is larger than the target value and adjusts a filter coefficient in a negative direction. The adjusted filter coefficient $W_{k+1}$ is provided to the equalizer 106 to decrease the output level of the minimum pit provided by the equalizer 106. Alternatively, where an error value detected by the level error detector 108 is negative (−), the filter coefficient adjustor 110 determines that the level of the minimum pit is smaller than the target value and adjusts a filter coefficient in a positive direction. The adjusted filter coefficient $W_{k+1}$ is provided to the equalizer 106 to increase the output level of the minimum pit provided by the equalizer 106.

With such an arrangement, the minimum pit having an appropriate level is output, thereby improving the performance of a Viterbi detector 112. In FIG. 1, $x_k$ denotes the input data of the equalizer 106, $y_k$ denotes the output data of the equalizer 106, and $W_{k+1}$ denotes the adjusted filter coefficient for the equalizer 106.

Meanwhile, the DC offset compensator 102 accumulates +1 where a sampled value $S_k$ from the ADC 100 which samples an input RF signal exceeds zero and −1 where the sampled value $S_k$ is smaller than zero. Where the accumulated value is equal to or larger than a predetermined positive (+) threshold, the DC offset compensator 102 decreases the sampled value $S_k$ by one level ($\frac{1}{2}^{(n-1)}$ in the case of n-bit sampling) using a level compensation value $L_k$ to compensate the sampled value $S_k$. Where the accumulated value is smaller than a predetermined negative (−) threshold, the DC offset compensator 102 increases the sampled value $S_k$ by one level using a level compensation value $L_k$ to compensate the sampled value $S_k$.

A DC offset is removed from the RF signal through such an arrangement. However, for example, if asymmetry occurs in the RF signal, a large error occurs between output data of the equalizer 106 and a decision level required by the Viterbi detector 112 even if the filter coefficient adjustor 110 detects an optimal FIR filter coefficient. Here, the decision level indicates the magnitude of a predicted sample value used in a branch metric operational unit of the Viterbi detector 112.

Accordingly, where a RF signal is distorted due to asymmetry and disc skew, the detection performance of a Viterbi detector is lowered even if equalization is performed using an optimal FIR filter coefficient.

SUMMARY OF THE INVENTION

To solve the above problems, it is a first object of the present invention to provide an apparatus for improving data detection performance by adjusting decision levels used in a data detector.

It is a second object of the present invention to provide an apparatus for monitoring the output of an equalizer, deciding the reference values, i.e., positive (+) and negative (−) maximum levels, positive (+) and negative (−) medium levels and a zero level, of decision levels used in a Viterbi detector, and feeding back the decided values to the Viterbi detector as the decision levels.

It is a third object of the present invention to provide a method of improving data detection performance by adjusting decision levels used in a data detector.

It is a fourth object of the present invention to provide a method of monitoring the output of an equalizer, deciding the reference values, i.e., + and − maximum levels, + and − medium levels and a zero level, of decision levels used in a Viterbi detector, and feeding back the decided values to the Viterbi detector as the decision levels.

It is a fifth object of the present invention to provide an apparatus for improving the detection performance of a data detector in an optical disc recording/reproducing apparatus.

Additional objects and advantages of the invention will be set forth in part in the description which follows, and, in part, will be obvious from the description, or may be learned by practice of the invention.

Accordingly, to achieve the above and other objects of the invention, there is provided a data reproducing apparatus including an equalizer which equalizes an input digital signal and a data detector which detects data from the output of the equalizer based on partial response maximum likelihood. The data reproducing apparatus comprises a level decision unit which detects levels corresponding to decision levels used in the data detector from the output of the equalizer and feeds back corrected decision levels to the data detector, the corrected decision level adaptively varying with the output level of the equalizer.

There is also provided a method of a data reproducing apparatus comprising an equalizer which equalizes an input digital signal and a data detector which detects data from the output of the equalizer based on partial response maximum likelihood. The data reproducing method comprises equalizing the input digital signal and outputting an equalized signal, detecting data from the equalized signal using decision levels, and detecting levels corresponding to the decision levels from the equalized signal and feeding back corrected decision levels adaptively varying with the level of the equalized signal as the decision levels used in the data detection.

BRIEF DESCRIPTION OF THE DRAWINGS

The above objects and advantages of the present invention will become more apparent by describing in detail preferred embodiments thereof with reference to the attached drawings in which:

FIG. 5 is a table illustrating the outputs of the level detector and the multiplexer of FIG. 3 where a PR(a, b, b, a) type Viterbi detector is used;

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 2:
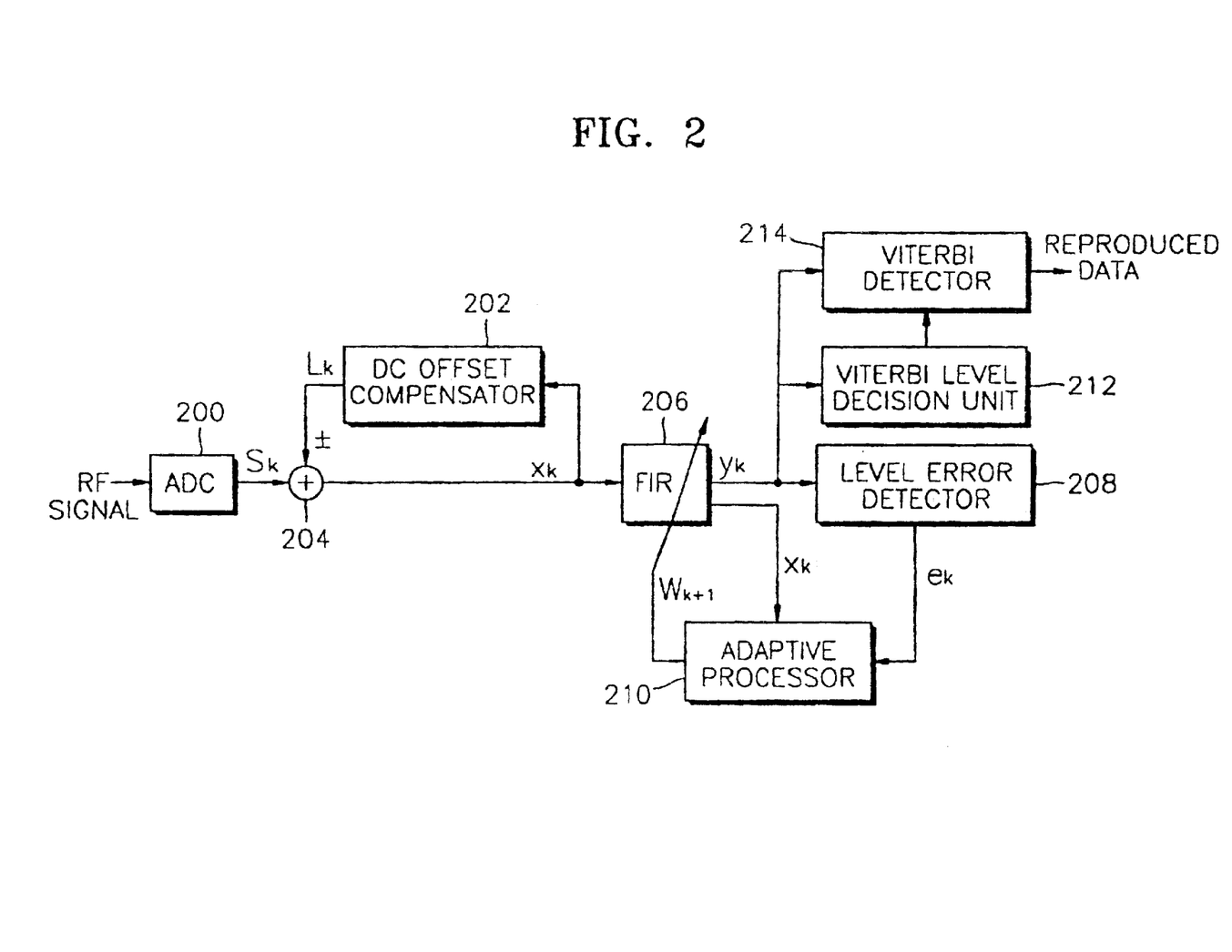
FIG. 2 is a block diagram illustrating a data reproducing apparatus according to an embodiment of the present invention.

In FIG. 2, which is a block diagram illustrating a data reproducing apparatus according to an embodiment of the present invention, an analog to digital converter (ADC) 200, a direct current (DC) offset compensator 202 and an adder 204 are the same as ADC 100, DC offset compensator 102, and adder 104, respectively, of the conventional data reproducing apparatus of FIG. 1, and thus descriptions of the operations thereof will be omitted. Equalizer 206 and Viterbi detector 214 are the same as equalizer 106 and Viterbi detector 112, respectively; however, certain inputs are provided differently according to the present invention as more specifically set out below.

For example, where the structure of the Viterbi detector 214 is a PR(a, b, a) type, a level error detector 208 initially sets reference values for + and − medium levels and + and − maximum levels, detects the + and − medium levels and the + and − maximum levels from an output signal $y_k$ of the equalizer 206, and obtains an error $e_k$ between a reference value and a detected level value $y_k$. Where the structure of the Viterbi detector 214 is a PR(a, b, b, a) type, the level error detector 208 initially sets a reference value for a zero level in addition to reference values for + and − medium levels and + and − maximum levels, detects the zero level, the + and − medium levels and the + and − maximum levels from an output signal $y_k$ of the equalizer 206, and obtains an error $e_k$ between a reference value and a detected level value $y_k$.

Where a target level value, that is, the reference value, is represented by $t_k$, the error value $e_k$ is obtained by subtracting the level value $y_k$ detected by the level error detector 208 from the target level value $t_k$ ($e_k = t_k − y_k$). Accordingly, a filter coefficient for the equalizer 206 is obtained through an adaptive process performed by an adaptive processor 210 using Equation (1) such that the error $e_k$ is minimized.

$$W_{k+1} = W_k + 2 \mu \cdot e_k \cdot x_k$$

where $W_{k+1}$ is an equalizer filter coefficient obtained after adaptation, $W_k$ is an equalizer filter coefficient obtained before adaptation, $\mu$ is a coefficient related to an equalizing rate (e.g., 0.001), $e_k$ is a level error, and $x_k$ is a signal obtained by DC offset compensating an input RF signal before equalization.

In this embodiment, an adaptive FIR filter coefficient for the equalizer 206 is detected using the level error detector 208 and the adaptive processor 210, but the present invention can also be applied to a different configuration of detecting a FIR filter coefficient of the equalizer 206.

A Viterbi level decision unit 212 detects + and − maximum levels, + and − medium levels (where the Viterbi detector 214 is a PR(a, b, a) type or a PR(a, b, b, a) type) and a zero level (where the Viterbi detector 214 is a PR(a, b, b, a) type) from the signal $y_k$, which has been FIR filtered using a filter coefficient obtained after adaptation, in a similar manner to the operation of the level error detector 208. The Viterbi decision unit 212 obtains averages of each of the detected levels and provides each of the averages as decision levels to the Viterbi detector 214. Here, the outputs of the Viterbi level decision unit 212 are referred to as corrected decision levels. The Viterbi level decision unit 212 is illustrated in FIG. 3 in detail.

Figure 3:
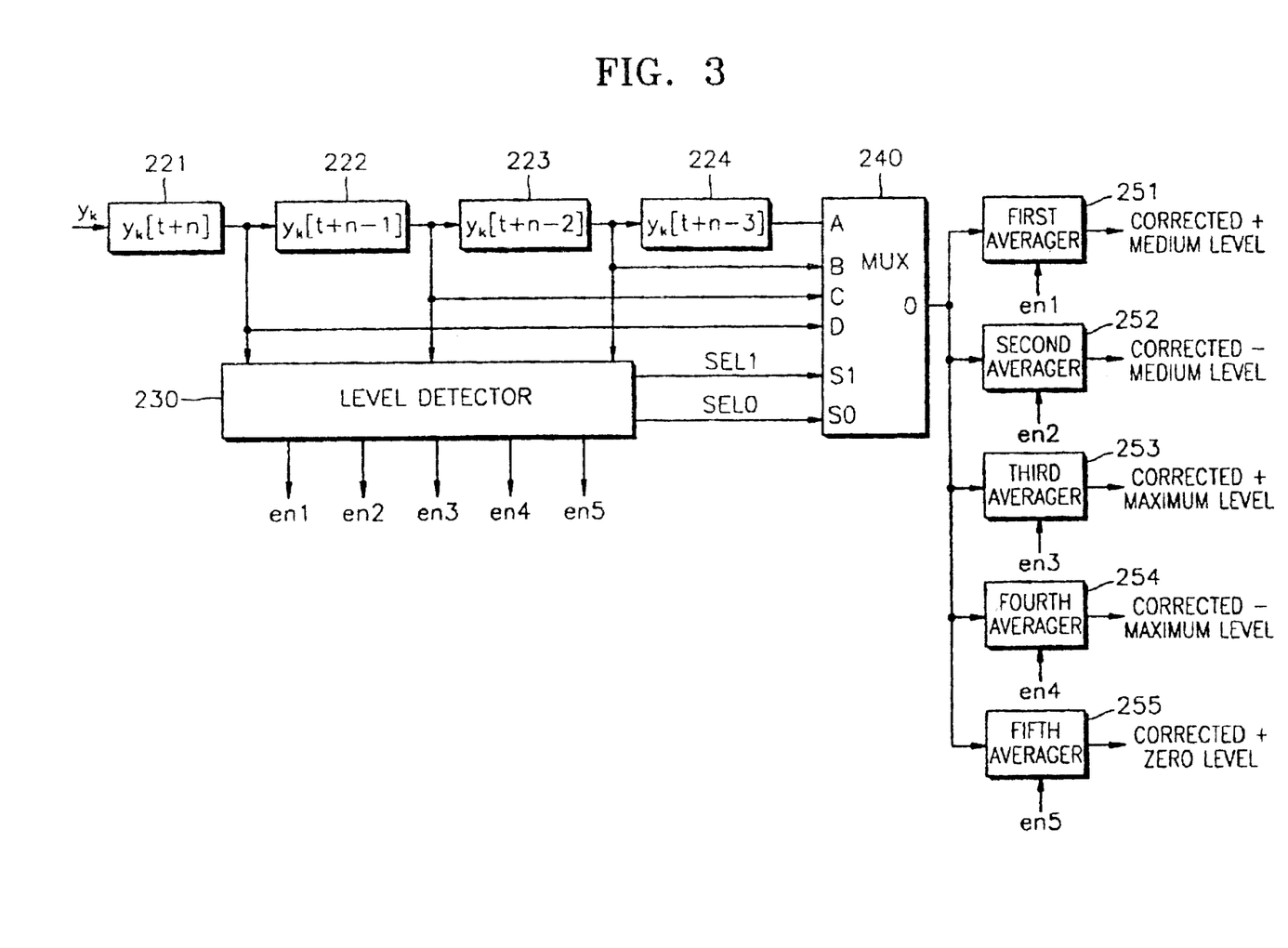
FIG. 3 is a detailed block diagram illustrating the Viterbi level decision unit of FIG. 2.

In FIG. 3, first through fourth delay units 221, 222, 223 and 224 temporarily stores a sample data $y_k$ output from the equalizer 206 and output current sample data $y_k[t+n]$, 1-sample previous data $y_k[t+n−1]$, 2-sample previous data $y_k[t+n−2]$ and 3-sample previous data $y_k[t+n−3]$, respectively.

A level detector 230 realized as a comparative logic circuit detects + and − medium levels, + and − maximum levels and a zero level from the outputs of the first, second and third delay units 221, 222 and 223 and provides + and − medium level enable signals en1 and en2, + and − maximum level enable signals en3 and en4, and a zero level enable signal en5 to respective first through fifth averagers 251, 252, 253, 254 and 255. The level detector 230 also provides first and second selection signals SEL0 and SEL1 to a multiplexer (MUX) 240. The enable signals en1, en2, en3, en4 and en5 can be referred to as first through fifth level decision signals.

In other words, when the Viterbi detector 214 is a PR(a, b, a) type, the level detector 230 determines that zero cross occurs at a point where the product of two consecutive sample data is smaller than zero and detects one of the two samples as a + medium level and the other as a − medium level. Where it is determined that three consecutive sample data exceed a predetermined threshold, the level detector 230 detects the central sample data among them as a + maximum level. Where it is determined that three consecutive sample data are smaller than the predetermined threshold, the level detector 230 detects the central sample data among them as a − maximum level.

Where the Viterbi detector 214 is a PR(a, b, b, a) type, the level detector 230 performs the same process as performed where the Viterbi detector 214 is a PR(a, b, a) type to detect + and − maximum levels; determines that zero cross occurs at a point where the product of two consecutive sample data is smaller than or equal to zero and detects sample data having a lower absolute value between the two sample data as a zero level; determines that zero cross occurs at a point where the product of two consecutive sample data is smaller than or equal to zero, compares the absolute values of the two sample data to each other, detects one sample data having an absolute value equal to or larger than that of the other sample data as a + medium level if the one sample data is larger than zero, detects the one sample data having an absolute value equal to or larger than that of the other sample data as a − medium level if the one sample data is smaller than zero, detects sample data preceding to the two consecutive sample data as a − or + medium level if the latter sample data of the two consecutive sample data is larger than zero, and detects sample data succeeding the compared two consecutive sample data as a − or + medium level if the former sample data of the two consecutive sample data is larger than zero.

Figure 4:
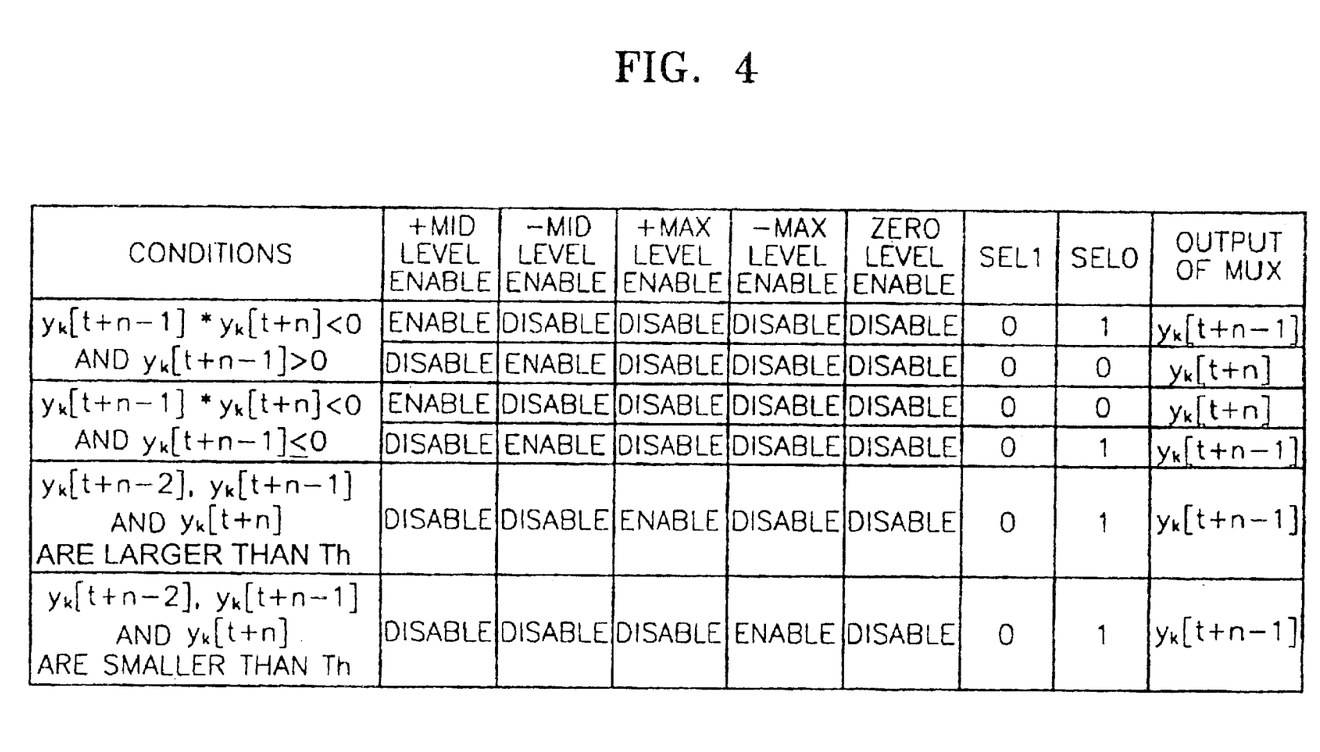
FIG. 4 is a table illustrating the outputs of the level detector and the multiplexer of FIG. 3 where a PR(a, b, a) type Viterbi detector is used.

FIG. 4 is a table showing the + and − medium level enable signals en1 and en2, +MID and −MID, respectively, + and − maximum level enable signals en3 and en4, +MAX and −MAX respectively, a zero level enable signal en5, ZERO, and the first and second selection signals SEL1 and SEL0 which are provided by the level detector 230 and the output of the MUX 240, where the Viterbi detector 214 of FIG. 2 is a PR(a, b, a) type.

FIG. 5 is a table showing the + and − medium level enable signals en1 and en2, +MID and −MID, respectively, + and − maximum level enable signals en3 and en4, +MAX and −MAX respectively, a zero level enable signal en5, ZERO, and the first and second selection signals SEL1 and SEL0 which are provided by the level detector 230 and the output of the MUX 240, where the Viterbi detector 214 of FIG. 2 is a PR(a, b, b, a) type.

The MUX 240 selects one among the outputs D, B, C, and A, corresponding to the first through fourth delay units 221 through 224, respectively, in response to the selection signals SEL0 and SEL1 provided from the level detector 230 and sends the selected one to the first through fifth averagers 251 through 255.

The first and second averagers 251 and 252 are enabled in response to the respective + and − medium level enable signals en1 and en2. When the Viterbi detector 214 is a PR(a, b, a) type, the product of two sample data $y_k[t+n-1]$ and $y_k[t+n]$ is smaller than zero, and the sample data $y_k[t+n]$ is larger than zero, the first averager 251 averages the outputs $y_k[t+n-1]$ of the second delay unit 222, which are provided through the MUX 240 and determined as the + medium level, and provides the averaged result as a corrected + medium level, and the second averager 252 averages the output $y_k[t+n]$ of the first delay unit 221, which is provided through the MUX 240 and determined as the − medium level, and provides the averaged result as a corrected − medium level. Where the sample data $y_k[t+n]$ is equal to or smaller than zero, the first averager 251 averages the outputs $y_k[t+n]$ of the first delay unit 221, which are provided through the MUX 240 and determined as the + medium level, and provides the averaged result as a corrected + medium level, and the second averager 252 averages the output $y_k[t+n-1]$ of the second delay unit 222, which are provided through the MUX 240 and determined as the − medium level, and provides the averaged result as a corrected − medium level. The outputs which are averaged by the first, second, third, fourth and fifth averagers are outputs which are provided sequentially by MUX 240 and which are enabled by the enable signals en1, en2, en3, en4 and en5, respectively.

When the Viterbi detector 214 is a PR(a, b, b, a) type, the product of two successive sample data $y_k[t+n-2]$ and $y_k[t+n-1]$ is equal to or smaller than zero, the absolute value of the sample data $y_k[t+n-1]$ is larger than the absolute value of the sample data $y_k[t+n-2]$, and the latter sample data $y_k[t+n-1]$ of the two consecutive sample data $y_k[t+n-2]$ and $y_k[t+n-1]$ is larger than zero, the first and second averagers 251 and 252 respectively average the outputs $y_k[t+n-3]$ of the fourth delay unit 224 determined as the + medium level and the outputs $y_k[t+n-1]$ of the second delay unit 222 determined as the − medium level, which are provided through the MUX 240, and provide the averaged results as a corrected + medium level and a corrected − medium level, respectively. When the latter sample data $y_k[t+n-1]$ is equal to or smaller than zero, the first and second averagers 251 and 252 respectively average the outputs $y_k[t+n-1]$ of the second delay unit 222 determined as the + medium level and the outputs $y_k[t+n-3]$ of the fourth delay unit 224 determined as the − medium level, which are provided through the MUX 240, and provide the averaged results as a corrected + medium level and a corrected − medium level, respectively.

Where the product of two sample data $y_k[t+n-2]$ and $y_k[t+n-1]$ is equal to or smaller than zero, the absolute value of the sample data $y_k[t+n-2]$ is larger than that of the sample data $y_k[t+n-1]$, and the former sample data $y_k[t+n-2]$ of the two consecutive sample data $y_k[t+n-2]$ and $y_k[t+n-1]$ is larger than zero, the first and second averagers 251 and 252 respectively average the outputs $y_k[t+n-2]$ of the third delay unit 223 determined as the + medium level and the outputs $y_k[t+n]$ of the first delay unit 221 determined as the − medium level, which are provided through the MUX 240, and provide the averaged results as a corrected + medium level and a corrected − medium level, respectively. Where the former data $y_k[t+n-2]$ is equal to or smaller than zero, the first and second averagers 251 and 252 respectively average the outputs $y_k[t+n]$ of the first delay unit 221 determined as the + medium level and the outputs $y_k[t+n-2]$ of the third delay unit 223 determined as the − medium level, which are provided through the MUX 240, and provide the averaged results as a corrected + medium level and a corrected − medium level, respectively.

The third averager 253 is enabled in response to the + maximum level enable signal en3. Where the three consecutive sample data $y_k[t+n-2]$, $y_k[t+n-1]$ and $y_k[t+n]$ are larger than a threshold Th, the third averager 253 averages the outputs $y_k[t+n-1]$ of the second delay unit 222, which have been determined as the + maximum level and provided through the MUX 240, and provides the averaged result as a corrected + maximum level. The fourth averager 254 is enabled in response to the − maximum level enable signal en4. Where the three consecutive sample data $y_k[t+n-2]$, $y_k[t+n-1]$ and $y_k[t+n]$ are smaller than the threshold Th, the fourth averager 254 averages the outputs $y_k[t+n-1]$ of the second delay unit 222, which have been determined as the − maximum level and provided through the MUX 240, and provides the averaged result as a corrected − maximum level.

The fifth averager 255 operates only where the Viterbi detector 214 is a PR(a, b, b, a) type and is enabled in response to the zero level enable signal en5. Where the product of the two sample data $y_k[t+n-1]$ and $y_k[t+n]$ is equal to or smaller than zero, and the absolute value of the sample data $y_k[t+n]$ is equal to or larger than that of the sample data $y_k[t+n-1]$, the fifth averager 255 averages the outputs $y_k[t+n-1]$ of the second delay unit 222, which have been determined as the zero level and provided through the MUX 240, and provides the averaged result as a corrected zero level. Where the absolute value of the sample data $y_k[t+n]$ is smaller than that of the sample data $y_k[t+n-1]$, the fifth averager 255 averages the outputs $y_k[t+n]$ of the first delay unit 221, which have been determined as the zero level and provided through the MUX 240, and provides the averaged result as a corrected zero level.

Figure 6:
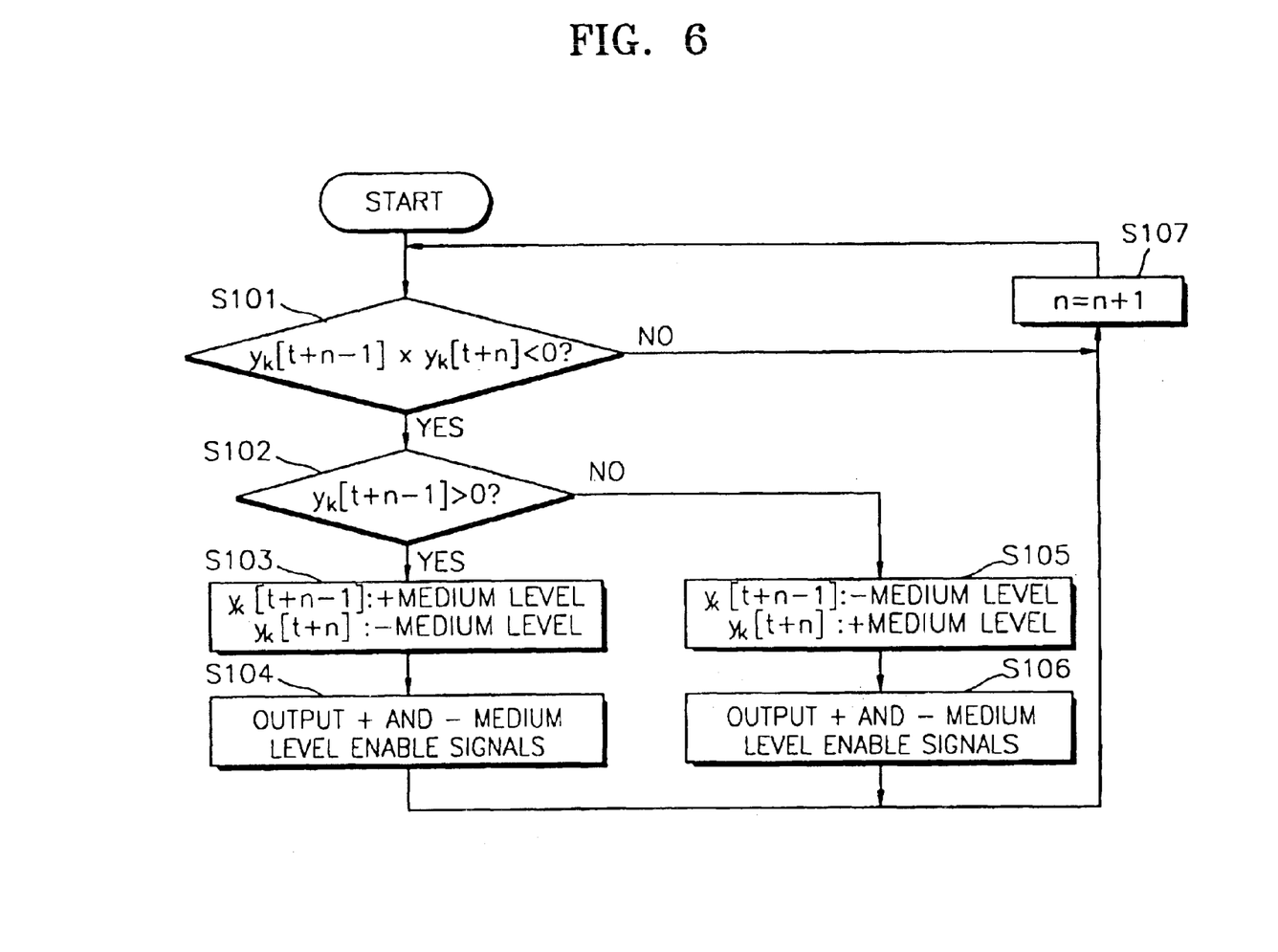
FIG. 6 is a diagram illustrating a method of detecting + and − medium levels from the output of the equalizer where a PR(a, b, a) type Viterbi detector and a run length limited (RLL) (1, 7) code are used.

FIG. 6 is a flowchart illustrating a method of detecting + and − medium levels from the output value of the equalizer 206 where a Viterbi detector 214 of a PR(a, b, a) type and a run length limited (RLL) (1, 7) code are used. The method is performed by the level detector 230 of FIG. 3. Here, the minimum run length of the RLL code is represented by "d (=1)", and the maximum thereof is represented by "k (=7)".

In operation S101, it is determined whether the product of two consecutive sample data $y_k[t+n-1]$ and $y_k[t+n]$, which are provided from the first and second delay units 221 and 222, is smaller than zero. If it is determined that the product is smaller than zero, one (here, the sample data $y_k[t+n-1]$) of the two sample data is selected, and it is determined whether the selected sample data is larger than zero, in operation S102. Here, sample data larger than zero is determined as a + medium level, and sample data smaller than zero is determined as a − medium level. In other words, where the sample data $y_k[t+n-1]$ is larger than zero, the sample data $y_k[t+n-1]$ output from the second delay unit 222 is detected as the + medium level, and the sample data $y_k[t+n]$ output from the first delay unit 221 is detected as the − medium level, in step S103. Then, in operation S104, a + medium level enable signal en1 and a − medium level enable signal en2 are output.

If it is determined that the sample data $y_k[t+n-1]$ is not larger than zero in operation S102, the sample data $y_k[t+n-1]$ output from the second delay unit 22 is detected as the − medium level, and the sample data $y_k[t+n]$ output from the first delay unit 221 is detected as the + medium level, in operation S105. Then, in operation S106, the + medium level enable signal en1 and the − medium level enable signal en2 are output. Where the product of the consecutive two sample data is equal to or larger than zero in operation S101, or where the operation S104 or S106 is completed, the operations S101 through S106 are repeatedly performed through operation S107 to detect + and − medium levels from a next sample.

Figure 7:
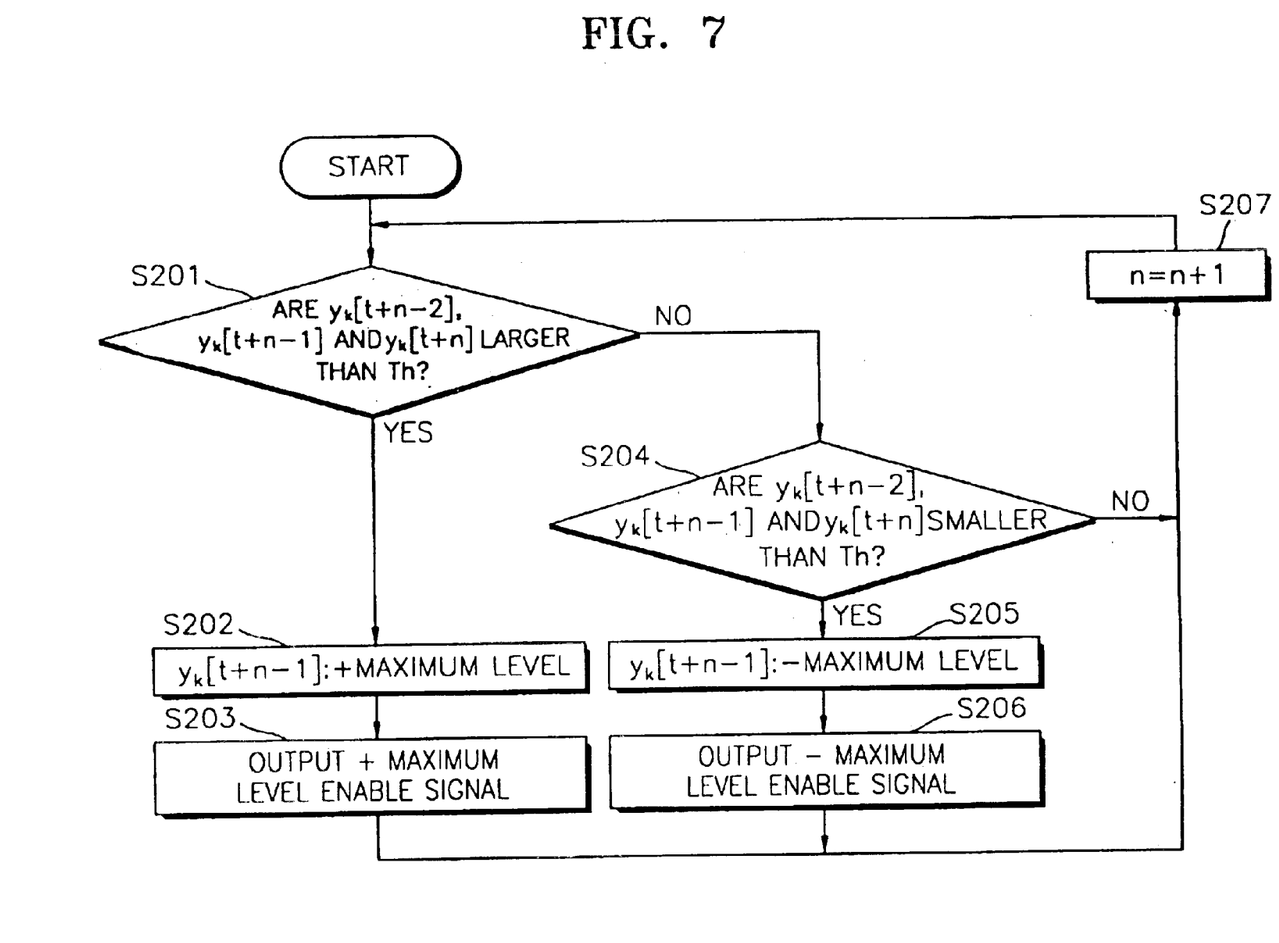
FIG. 7 is a diagram illustrating a method of detecting + and − maximum levels from the output of the equalizer where a PR(a, b, a) type Viterbi detector and a RLL(1, 7) code are used or where a PR(a, b, b, a) type Viterbi detector and a RLL(2, 10) code are used.

FIG. 7 is a flowchart illustrating a method of detecting + and − maximum levels from the output value of the equalizer 206 where a Viterbi detector 214 of a PR(a, b, a) type and a run length limited (RLL) (1, 7) code are used, or where a Viterbi detector 214 of a PR(a, b, b, a) type and a run length limited (RLL) (2, 10) code are used. The method is performed by the level detector 230 of FIG. 3.

In operation S201, three consecutive sample data $y_k[t+n-2]$, $y_k[t+n-1]$ and $y_k[t+n]$ output from the first through third delay units 221 through 223 are checked whether they are all larger than a threshold Th. If the three successive sample data are all larger than the threshold Th, the central sample data $y_k[t+n-1]$ output from the second delay unit 222, among the three consecutive data $y_k[t+n-2]$, $y_k[t+n-1]$ and $y_k[t+n]$, is detected as a + maximum level in operation S202. Then, in operation S203, a + maximum level enable signal en3 is output.

If it is determined that any one of the three consecutive sample data $y_k[t+n-2]$, $y_k[t+n-1]$ and $y_k[t+n]$ is smaller than the threshold Th in operation S201, it is determined in operation S204 whether the three consecutive sample data $y_k[t+n-2]$, $y_k[t+n-1]$ and $y_k[t+n]$ are all smaller than the threshold Th. If it is determined that the three successive sample data are all smaller than the threshold Th, the central sample data $y_k[t+n-1]$ output from the second delay unit 222 is detected as the − maximum level in operation S205. Then, in operation S206, a − maximum level enable signal en4 is output.

Where it is determined that one of the three consecutive sample data $y_k[t+n-2]$, $y_k[t+n-1]$ and $y_k[t+n]$ is equal to or larger than the threshold Th in operation S204, or where the operation S203 or S206 is completed, the operations S210 through S206 are repeated through operation S207 to detect + and − maximum levels from a next sample.

Figure 8:
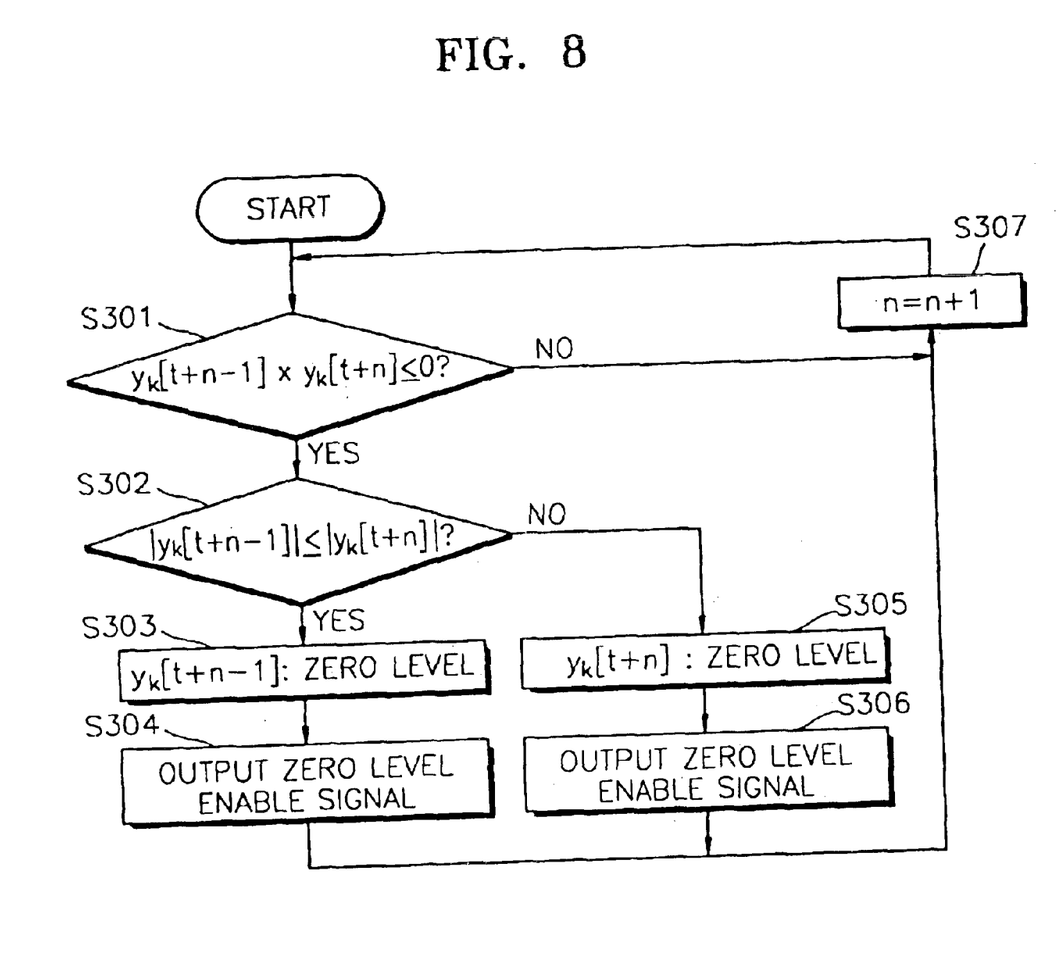
FIG. 8 is a diagram illustrating a method of detecting a zero level from the output of the equalizer where a PR(a, b, b, a) type Viterbi detector and a RLL(2, 10) code are used.

FIG. 8 is a flowchart illustrating a method of detecting a zero level from the output value of the equalizer 206 where the Viterbi detector 214 of a PR(a, b, b, a) type and a run length limited (RLL) (2, 10) code are used. The method is performed by the level detector 230 of FIG. 3.

In operation S301, two consecutive sample data $y_k[t+n-1]$ and $y_k[t+n]$ output from the first and second delay units 221 and 222 are checked to determine whether the product of the two consecutive sample data $y_k[t+n-1]$ and $y_k[t+n]$ is equal to or smaller than zero. If the product is equal to or smaller than zero, the absolute values of the two consecutive sample data $y_k[t+n-1]$ and $y_k[t+n]$ are compared in operation S302.

In more detail, where the absolute value of former sample data $y_k[t+n-1]$ between the two consecutive sample data $y_k[t+n-1]$ and $y_k[t+n]$ is smaller than or equal to the absolute value of the latter sample data $y_k[t+n]$, the sample data $y_k[t+n-1]$ output from the second delay unit 222 is detected as a zero level in operation S303. Then, in operation S304, a zero level enable signal en5 is output. Where it is determined that the absolute value of the latter sample data $y_k[t+n]$ is smaller than that of the former sample data $y_k[t+n-1]$ in operation S302, the sample data $y_k[t+n]$ output from the first delay unit 221 is detected as a zero level in operation S305. Then, in operation S306, a zero level enable signal en5 is output. Where the product of the two consecutive sample data $y_k[t+n-1]$ and $y_k[t+n]$ is larger than zero in operation S301, or where the operation S304 or S306 is completed, the operations S301 through S306 are repeated through operation S307 to detect a zero level from a next sample.

Figure 9:
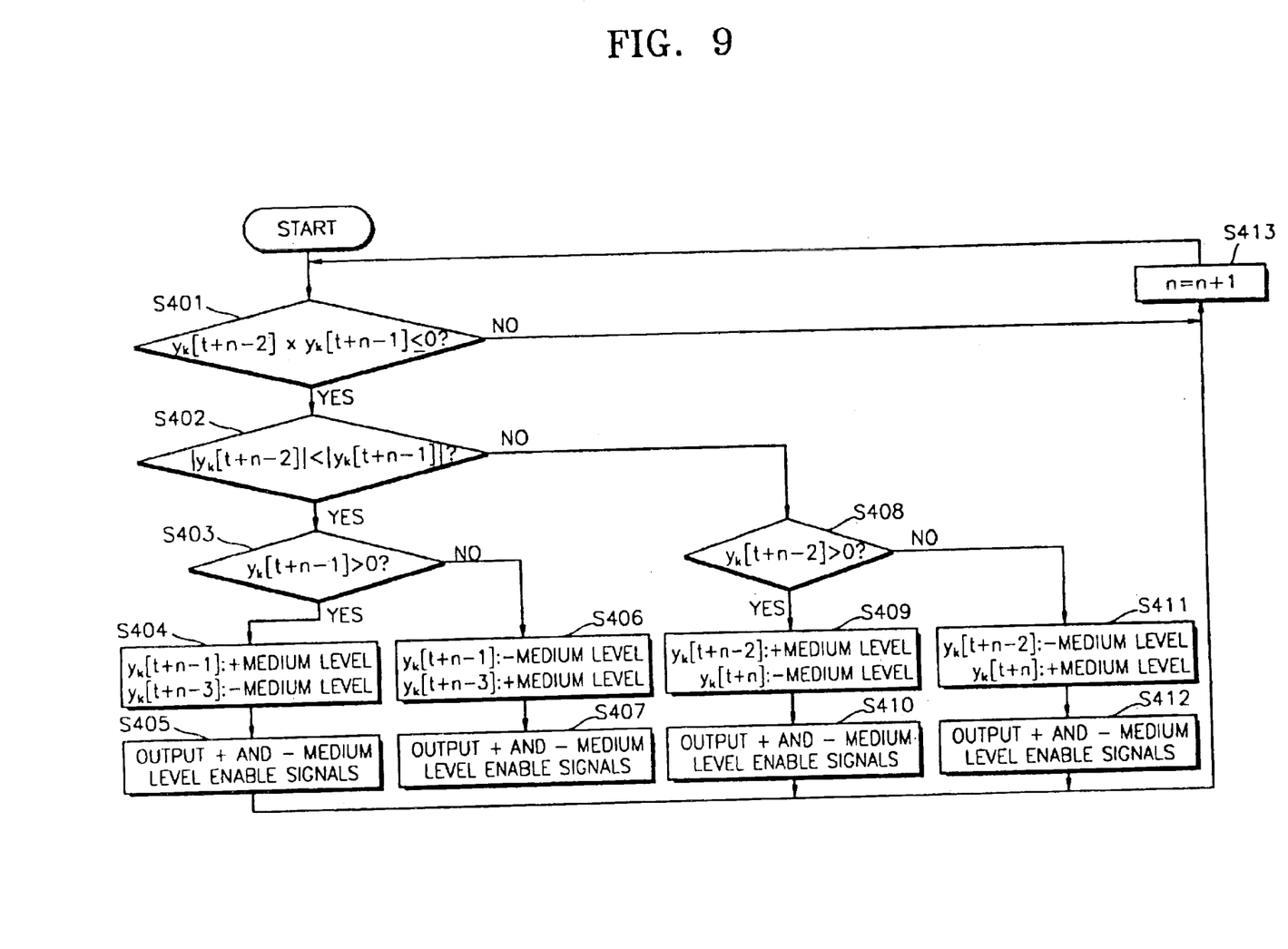
FIG. 9 is a diagram which illustrates a method of detecting + and − medium levels from the output of the equalizer where a PR(a, b, b, a) type Viterbi detector and a RLL(2, 10) code are used.

FIG. 9 is a flowchart illustrating a method of detecting + and − medium levels from an output value of the equalizer 206 where a Viterbi detector 214 of a PR(a, b, b, a) type and a run length limited (RLL) (2, 10) code are used. The method is performed by the level detector 230 of FIG. 3.

In operation S401, two consecutive sample data $y_k[t+n-2]$ and $y_k[t+n-1]$ output from the second and third delay units 222 and 223 are checked to determine whether the product of the two consecutive sample data $y_k[t+n-2]$ and $y_k[t+n-1]$ is equal to or smaller than zero. If the product is equal to or smaller than zero, the absolute values of the two consecutive sample data $y_k[t+n-2]$ and $y_k[t+n-1]$ are compared with each other in operation S402. Where the one sample data of the two consecutive sample data, whose absolute value is equal to or larger than the absolute value of the other of the two consecutive sample data $y_k[t+n-2]$ and $y_k[t+n-1]$ is larger than zero, the one sample data is detected as a + medium level. Where the one sample data of the two consecutive sample data, whose absolute value is equal to or larger than the absolute value of the other of the two consecutive sample data is smaller than zero, the one sample data is detected as a − medium level. Where the sample data having a smaller absolute value is larger than zero, the sample data is detected as a + medium level. Alternatively, where the sample data having a smaller absolute value is smaller than zero, the sample data is detected as a − medium level.

In more detail, where the latter sample data $y_k[t+n-1]$ between the two consecutive sample data $y_k[t+n-2]$ and $y_k[t+n-1]$ is larger than zero in operation S403, the latter sample data $y_k[t+n-1]$ output from the second delay unit 222 is detected as the + medium level, and sample data $y_k[t+n-3]$ output from the fourth delay unit 224 preceding the compared two sample data is detected as the − medium level, in operation S404. Then, in operation S405, a + medium level enable signal en1 and a − medium level enable signal en2 are output.

Where the latter sample data $y_k[t+n-1]$ between the compared two sample data is not larger than zero in operation S403, the latter sample data $y_k[t+n-1]$ output from the second delay unit 222 is detected as the − medium level, and the sample data $y_k[t+n-3]$ output from the fourth delay unit 224 preceding the compared two sample data is detected as the + medium level, in operation S406. Then, in operation S407, a + medium level enable signal en1 and a − medium level enable signal en2 are output.

Where the former sample data $y_k[t+n-2]$ between the compared two consecutive sample data $y_k[t+n-2]$ and $y_k[t+n-1]$ is larger than zero in operation S408, the former sample data $y_k[t+n-2]$ output from the third delay unit 223 is detected as the + medium level, and sample data $y_k[t+n]$ output from the first delay unit 221 succeeding the compared two sample data is detected as the − medium level, in operation S409. Then, in operation S410, a + medium level enable signal en1 and a − medium level enable signal en2 are output.

Where the former sample data $y_k[t+n-2]$ is not larger than zero in operation S408, the former sample data $y_k[t+n-2]$ output from the third delay unit 223 is detected as the − medium level, and sample data $y_k[t+n]$ output from the first delay unit 221 succeeding the compared two sample data is detected as the + medium level, in operation S411. Then, in operation S412, a − medium level enable signal en2 and a + medium level enable signal en1 are output.

Where the product of the two consecutive sample data is larger than zero in operation S401, or where the operation S405, S407, S410 or S412 is completed, the operations S401 through S412 are repeated through operation S413 to detect + and − medium levels from a next sample.

The detecting methods illustrated in FIGS. 6 through 9 can be applied to level error detection performed by the level error detector of FIG. 2.

Figure 10:
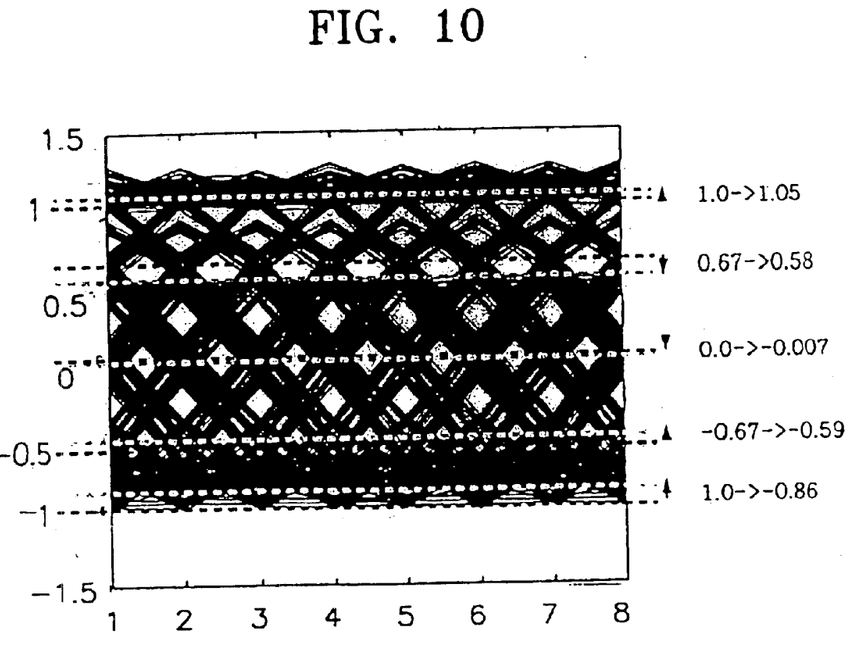
FIG. 10 is a diagram illustrating the differences between the outputs of the equalizer and the decision levels used in the Viterbi detector where asymmetry is 0.7.

FIG. 10 is a diagram illustrating differences between outputs of the equalizer 206 and decision levels of the Viterbi detector 214 where the Viterbi detector is a PR(1, 2, 2, 1) type, and asymmetry is 0.7 (about 20%). Where the output level $y_k$ of the equalizer 206 is normal, it is supposed that the + and − maximum levels are +1 and −1, the + and − medium levels are +0.67 and −0.67, and the zero level is 0. However, it actually appears that the + and − maximum levels are +1.05 and −0.86, the + and − medium levels are +0.58 and −0.59, and the zero level is −0.007. These differences are accumulated at the Viterbi detector 214 as an error, thereby degrading the detection performance.

This means that an actual output waveform of the equalizer 206 is not like a waveform that is modeled in the PR(1, 2, 2, 1) type Viterbi detector 214. In particular, where a component such as asymmetry exists, an error is much larger. Accordingly, the detection levels of the Viterbi detector 214 are corrected to correct such an error. Where decision levels corrected by the Viterbi level decision unit 212 according to the present invention are used, the detection performance for an input signal having asymmetry is improved, as shown in FIG. 11.

Figure 11:
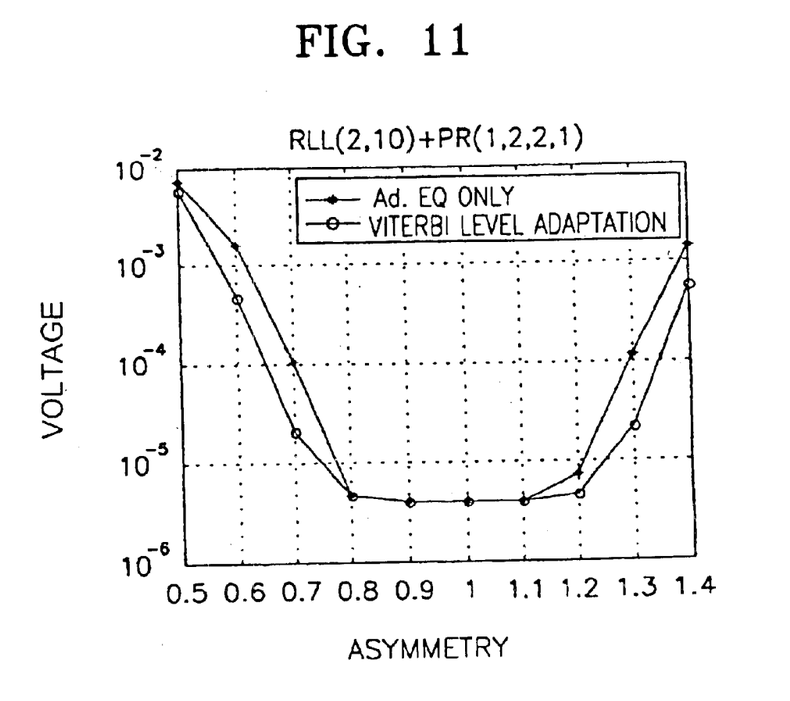
FIG. 11 is a diagram comparing the detection performance for an input signal having asymmetry where decision levels processed only by the equalizer are used with the detection performance for an input signal having asymmetry where corrected decision levels are used.

FIG. 11 is a diagram comparing the detection performance for an input signal having asymmetry, where decision levels are processed only by the equalizer 206, with the detection performance for an input signal having asymmetry, where decision levels are corrected by the Viterbi level decision unit 212. The diagram is related to a RLL(2, 10) code and a Viterbi detector 214 of a PR(1, 2, 2, 1) type. It can be seen that the data detection performance where the decision levels corrected by the Viterbi level decision unit 212 are used in the Viterbi detector 214 is better than that where the decision levels processed only by the equalizer 206 are used in the Viterbi detector 214.

Figure 12:
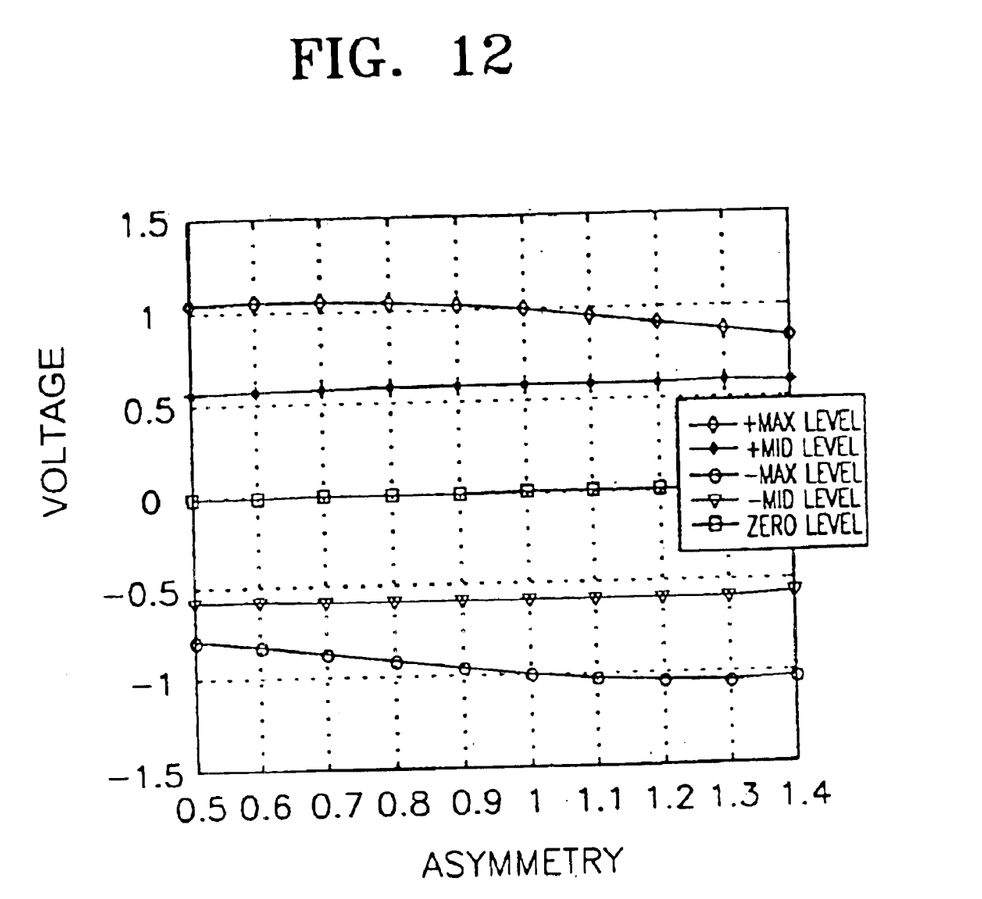
FIG. 12 is a diagram illustrating decision levels of the Viterbi detector which have been corrected according to asymmetry.

FIG. 12 is a diagram illustrating the variations of the decision levels of the Viterbi detector which have been corrected according to asymmetry. As asymmetry is larger, the variations of the + and − maximum levels are larger than those of the zero level and the + and − medium levels.

As described above, the present invention monitors the output of an equalizer, determines + and − maximum levels, + and − medium levels and a zero level, which are the reference values of decision levels used in a Viterbi detector, and uses the determined levels as the decision levels for the Viterbi detector, thereby improving a data bit error rate. Consequently, the present invention can improve data detection performance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data reproducing apparatus comprising:
   an equalizer which equalizes an input digital signal;
   a data detector which detects the equalized digital signal based on partial response maximum likelihood; and
   a level decision unit which detects levels corresponding to decision levels used in the data detector from the output of the equalizer and feeds back corrected decision levels to the data detector, the corrected decision levels adaptively varying with the output level of the equalizer, wherein the level decision unit comprises:
   a plurality of delay units which temporarily store sequential ones of the equalized digital signals;
   a level detector which compares consecutive two or three sample data provided from the plurality of delay units to detect decision levels used in the data detector and which outputs a plurality of level decision enable signals and a plurality of selection signals;

a multiplexer which selectively outputs the outputs of the plurality of delay units in response to the selection signals; and a plurality of averagers each of which averages the outputs of the multiplexer on being enabled by one of the plurality of enable signals and feeds back an averaged corrected decision level as the corrected decision level to the data detector.

2. The data reproducing apparatus of claim 1, wherein the data detector is a PR(a, b, a) type.

3. The data reproducing apparatus of claim 2, wherein the level detector determines that zero cross occurs at a point where a product of two consecutive sample data output from ones of the plurality of delay units is smaller than 0 and detects one of the two sample data as a positive medium level and the other as a negative medium level.

4. The data reproducing apparatus of claim 2, wherein the level detector detects the central sample data among three consecutive sample data output from the plurality of delay units as a positive maximum level where all the three sample data are larger than a predetermined threshold, and detects the central sample data as a negative maximum level where all the three sample data are smaller than the predetermined threshold.

5. The data reproducing apparatus of claim 1, wherein the data detector is a PR(a, b, b, a) type.

6. The data reproducing apparatus of claim 5, wherein the level detector:

determines that zero cross occurs at a point where the product of two consecutive sample data output from ones of the plurality of delay units is equal to or smaller than 0, compares the absolute values of the two sample data, detects the sample data having the absolute value which is equal to or larger than the absolute value of the other of the two sample data as a positive medium level where the sample data having the absolute value which is equal to or larger than the absolute value of the other of the two sample data is larger than 0 and as a negative medium level where the sample data having the absolute value which is equal to or larger than the absolute value of the other of the two sample data is smaller than 0, detects sample data preceding the compared two sample data as a negative or positive medium level where the latter sample data between the two consecutive sample data is larger than 0, and detects sample data succeeding the compared two sample data as a negative or positive medium level where the former sample data between the two consecutive sample data is larger than 0.

7. The data reproducing apparatus of claim 5, wherein the level detector:

detects the central sample data among three consecutive sample data output from the plurality of delay units as a positive maximum level where all the three sample data are larger than a predetermined threshold, and detects the central sample data as a negative maximum level where all the three sample data are smaller than the predetermined threshold.

8. The data reproducing apparatus of claim 5, wherein the level detector:

determines that zero cross occurs at a point where the product of two consecutive sample data output from ones of the plurality of delay units is equal to or smaller than 0; and detects as a zero level the sample data of the two consecutive sample data having an absolute value which is smaller than the absolute value of the other of the two consecutive sample data.

9. A data reproducing apparatus comprising:

a sampler which samples an input radio frequency (RF) signal and provides sample data;

a direct current (DC) offset compensator which eliminates a DC offset from the sample data and outputs compensated digital signal;

an equalizer which equalizes the compensated digital signal;

a data detector which detects the equalized digital signal based on partial response maximum likelihood;

a level error detector which detects levels corresponding to decision levels used in the data detector from the equalized digital signal and detects level errors between the detected levels and predetermined reference values;

a level decision unit which detects levels corresponding to the decision levels used in the data detector from the output of the equalizer and feeds back corrected decision levels to the data detector, the corrected decision levels adaptively varying with the output level of the equalizer; and an adaptive processor which provides an adaptive filter coefficient to the equalizer so that the differences between the level errors and target level values are minimized.

10. A data reproducing apparatus comprising:

a sampler which samples an input radio frequency (RF) signal and provides sample data;

a direct current (DC) offset compensator which eliminates a DC offset from the sample data and outputs a compensated digital signal;

an equalizer which equalizes the compensated digital signal;

a data detector which detects the equalized digital signal based on partial response maximum likelihood;

a level error detector which detects levels corresponding to decision levels used in the data detector from the equalized digital signal and detects level errors between the detected levels and predetermined reference values;

a level decision unit which detects levels corresponding to the decision levels used in the data detector from the output of the equalizer and feeds back corrected decision levels to the data detector, the corrected decision levels adaptively varying with the output level of the equalizer, wherein the level decision unit comprises:

first through fourth delay units which temporarily store a plurality of consecutive samples of the data output from the equalizer, a level detector which compares consecutive two or three sample data of the plurality of consecutive samples output from some of the first through fourth delay units to detect the decision levels used in the data detector and provides first through fifth level decision enable signals and selection signals, a multiplexer which selects one of the outputs of the first through fourth delay units in response to the selection signals and provides the selected output as a decision value of a level corresponding to the selection signals, and first through fifth averagers which are enabled by the first through fifth level decision enable signals, respectively, and which provide averaged corrected positive and negative medium levels, averaged corrected positive and negative maximum levels and an averaged corrected zero level to the data detector, each of the first through fifth averagers averaging decision values of the level corresponding to the selection signals; and an adaptive processor which provides an adaptive filter coefficient to the equalizer so that the differences between the level errors and target level values are minimized.

11. A method of reproducing data from an input digital signal based on partial response maximum likelihood, the method comprising:

equalizing the input digital signal to output an equalized signal;

detecting data from the equalized signal using decision levels: and detecting levels corresponding to the decision levels from the equalized signal and adaptively varying the decision levels according to the detected levels, wherein the detecting of levels comprises:

temporarily storing a plurality of consecutive samples of the equalized data;

comparing two or three sample data of the consecutive data samples to detect the decision levels used in the detecting of data and providing a plurality of level decision enable signals and selection signals;

selecting one among the consecutive data samples in response to the selection signals to output the selected sample data as the decision value of a level corresponding to the selection signals; and averaging decision values of the level corresponding to the selection signals in response to one of the plurality of level decision enable signals to adaptively vary the decision levels of the data detector.

12. The method of claim 11, wherein the data detector is a PR(a, b, a) type.

13. The method of claim 12, wherein the comparing comprises:

determining that zero cross occurs at a point where a product of two consecutive sample data is smaller than 0;

detecting one of the two consecutive sample data as a positive medium level, and detecting the other of the two consecutive sample data as a negative medium level.

14. The method of claim 12, wherein the comparing comprises:

detecting central sample data among the three consecutive sample data provided as a positive maximum level where all the three consecutive sample data are larger than a predetermined threshold; and detecting the central sample data as a negative maximum level where all the three consecutive sample data are smaller than the predetermined threshold.

15. The method of claim 11, wherein the data detector is a PR(a, b, b, a) type.

16. The method of claim 15, wherein the comparing comprises:

determining that zero cross occurs at a point where a product of two consecutive sample data is equal to or smaller than 0;

comparing the absolute value of the two consecutive sample data;

detecting one of the two consecutive sample data whose absolute value is equal to or larger than the absolute value of the other of the two consecutive sample data as a positive medium level where the one sample data is larger than 0 and detecting the one sample data as a negative medium level where the one sample data is smaller than 0; and detecting sample data preceding the compared two consecutive sample data as a negative or positive medium level where the latter sample data of the two consecutive sample data is larger than 0, and detecting sample data succeeding the compared two consecutive sample data as a negative or positive medium level where the former sample data of the two consecutive sample data is larger than 0.

17. The method of claim 15, wherein the comparing comprises:

detecting a central sample data among the three consecutive sample data as a positive maximum level where all of the three consecutive sample data are larger than a predetermined threshold, and detecting the central sample data as a negative maximum level where all of the three consecutive sample data are smaller than the predetermined threshold.

18. The method of claim 15, wherein the comparing comprises:

determining that zero cross occurs at a point where the product of two consecutive sample data is equal to or smaller than 0, and the sample data whose absolute value is smaller than the absolute value of the other of the two sample data Is detected as a zero level.

19. A data reproducing apparatus comprising:

a partial response maximum likelihood (PMRL) detector which detects data from a digital signal based on a plurality of decision levels;

a level decision unit which detects a level in each sample of a plurality of groups of consecutive samples of the digital signal and selects respective samples of each group corresponding to respective ones of the plurality of decision levels; and a plurality of averagers, each of which averages the corresponding selected respective samples of successive groups of consecutive samples and adjusts respective ones of the plurality of decision levels based on the respective averages.

20. The data reproducing apparatus as claimed in claim 19, wherein a number of the plurality of decision levels is three.

21. The data reproducing apparatus as claimed in claim 19, wherein a number of the plurality of decision levels is five.

22. A method of reproducing data from a digital signal based on partial response maximum likelihood (PMRL), the method comprising:

providing a data detector which detects data based on at least one decision level;

selecting a plurality of samples of the digital signal corresponding to the at least one decision level; and averaging the selected plurality of samples and providing the average of the selected plurality of samples to the data detector as the at least one decision level.

23. The method as claimed in claim 22, wherein:

the data detector detects data based on the at least one decision level and another decision level;

the selecting further comprises selecting a second plurality of samples corresponding to the another decision level; and the averaging further comprises averaging the second selected plurality of samples and providing the average of the second plurality of samples to the data detector as the another decision level.

* * * * *